United States Patent
Pisharody et al.

(10) Patent No.: US 10,594,657 B1
(45) Date of Patent: Mar. 17, 2020

(54) METHODS FOR PARAMETERIZED SUB-POLICY EVALUATION FOR FINE GRAIN ACCESS CONTROL DURING A SESSION AND DEVICES THEREOF

(71) Applicant: F5 Networks, Inc., Seattle, WA (US)

(72) Inventors: Vinod Pisharody, Seattle, WA (US); James Hu, Seattle, WA (US); Wui Chung Lie, Seattle, WA (US); Bipin Kumar, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 170 days.

(21) Appl. No.: 15/717,633

(22) Filed: Sep. 27, 2017

Related U.S. Application Data

(60) Provisional application No. 62/416,522, filed on Nov. 2, 2016.

(51) Int. Cl.
*H04L 29/06* (2006.01)

(52) U.S. Cl.
CPC ...... *H04L 63/0263* (2013.01); *H04L 63/0236* (2013.01); *H04L 63/20* (2013.01)

(58) Field of Classification Search
CPC .. H04L 63/0263; H04L 63/0236; H04L 63/20
See application file for complete search history.

(56) References Cited

U.S. PATENT DOCUMENTS

| | | | | |
|---|---|---|---|---|
| 9,059,985 B1 * | 6/2015 | Treleaven | | H04L 63/08 |
| 10,142,308 B1 * | 11/2018 | Duchin | | H04L 63/08 |
| 10,146,933 B1 * | 12/2018 | Schoenbrun | | G06F 21/46 |
| 2003/0023880 A1 * | 1/2003 | Edwards | | H04L 63/0815 |
| | | | | 726/1 |
| 2003/0115267 A1 * | 6/2003 | Hinton | | G06F 21/41 |
| | | | | 709/204 |
| 2004/0054791 A1 * | 3/2004 | Chakraborty | | H04L 63/20 |
| | | | | 709/229 |
| 2009/0063665 A1 * | 3/2009 | Bagepalli | | H04L 63/166 |
| | | | | 709/222 |

(Continued)

OTHER PUBLICATIONS

F5 Networks Inc., "BIG-IP APM 12.0.0", Release Notes, Jun. 19, 2017, pp. 1-50, F5 Networks, Inc., Retrieved from the Internet<https://support.f5.com/kb/en-us/products/big-ip_apm/releasenotes/product/relnote-apm-12-0-0.html>.

(Continued)

*Primary Examiner* — John B King
(74) *Attorney, Agent, or Firm* — Pepper Hamilton LLP

(57) ABSTRACT

Methods, non-transitory computer readable media, network traffic management apparatuses, and network traffic management systems that provide parameterized sub-policy evaluation for fine grain access control implemented by determining when there is a result for one of the plurality of sub-policies being evaluated for a received request for a resource during a session. The result for evaluation of the one of the plurality of sub-policies for the received request is used when the determination indicates the result is stored for the session. The one of the plurality of sub-policies is executed on the received request to obtain the result when the determination indicates the result is not stored for the session. The result for the one of the plurality of sub-policies from this execution is stored for the session.

12 Claims, 7 Drawing Sheets

(56) References Cited

U.S. PATENT DOCUMENTS

| | | | | |
|---|---|---|---|---|
| 2009/0077618 | A1* | 3/2009 | Pearce | H04L 63/0892 726/1 |
| 2010/0023454 | A1* | 1/2010 | Exton | G06F 21/31 705/44 |
| 2012/0042395 | A1* | 2/2012 | Jain | G06F 21/6218 726/30 |
| 2012/0310980 | A1* | 12/2012 | Hepper | G06F 16/957 707/776 |
| 2014/0304830 | A1* | 10/2014 | Gammon | G06F 21/60 726/27 |
| 2015/0281279 | A1* | 10/2015 | Smith | H04L 63/20 726/1 |
| 2018/0004930 | A1* | 1/2018 | Csinger | G06F 21/40 |

OTHER PUBLICATIONS

F5 Networks Inc., "BIG-IP® Access Policy Manager®: Application Access", Manual, Sep. 1, 2015, pp. 1-66, vol. 12.1, F5 Networks, Inc., Retrieved from the Internet<https://support.f5.com/kb/en-us/products/big-ip_apm/manuals/product/apm-application-access-12-0-0.html>.

F5 Networks Inc., "BIG-IP® Access Policy Manager®: Network Access", Manual, Sep. 1, 2015, pp. 1-108, vol. 12.0, F5 Networks, Inc., Retrieved from the Internet<https://support.f5.com/kb/en-us/products/big-ip_apm/manuals/product/apm-network-access-12-0-0.html>.

F5 Networks Inc., "BIG-IP® Access Policy Manager®: Edge Client® and Application Configuration", Manual, Oct. 13, 2015, pp. 1-72, vol. 12.0, F5 Networks, Inc., Retrieved from the Internet<https://support.f5.com/kb/en-us/products/big-ip_apm/manuals/product/apm-client-configuration-12-0-0.html>.

F5 Networks Inc., "F5 BIG-IP Access Policy Management Operations Guide", Manual, May 5, 2015, pp. 1-172, F5 Networks, Inc., Retrieved from the Internet<https://support.f5.com/kb/en-us/products/big-ip_apm/manuals/product/f5-apm-operations-guide.html>.

F5 Networks Inc., "F5 BIG-IP TMOS: Operations Guide", Manual, Mar. 5, 2015, pp. 1-236, F5 Networks, Inc., Retrieved from the Internet<https://support.f5.com/kb/en-us/products/big-ip_ltm/manuals/product/f5-tmos-operations-guide.html>.

F5 Networks Inc., "BIG-IP® Access Policy Manager®: Implementations", Manual, Sep. 1, 2015, pp. 1-108, vol. 12.0, F5 Networks, Inc., Retrieved from the Internet<https://support.f5.com/kb/en-us/products/big-ip_apm/manuals/product/apm-implementations-12-0-0.html>.

Big-IP® Access Policy Manager®: Implementations, Version 12.0, F5 Networks, Inc., 2015, pp. 1-108.

BIG-IP® Analytics: Implementations, version 12.0, Sep. 1, 2015, F5 Networks, Inc., pp. 1-50.

Big-IP® Application Security Manager™: Implementations, Version 12.0, F5 Networks, Inc., 2015-2016, pp. 1-352.

F5 Networks, Inc., "BIG-IP APM", Release Notes, Aug. 9, 2016, pp. 1-9, version 11.6.1, F5 Networks, Inc.

F5 Networks, Inc., "BIG-IP APM 11.4.1", Release Notes, Nov. 7, 2014, Version 11.4.1.

F5 Networks, Inc., "BIG-IP® Access Policy Manager® Authentication Configuration Guide ", Manual, Sep. 17, 2013, pp. 1-201, Version 11.4.

F5 Networks, Inc., "BIG-IP® Access Policy Manager®: Application Access Guide", Manual, Jun. 11, 2013, pp. 1-26, Version 11.4.

F5 Networks, Inc., "BIG-IP® Access Policy Manager®: Application Access", Manual, Aug. 25, 2014, pp. 1-50, version 11.6, F5 Networks, Inc.

F5 Networks, Inc., "BIG-IP® Access Policy Manager®: Authentication and Single Sign-On", Manual, Aug. 25, 2014, pp. 1-308, version 11.6, F5 Networks, Inc.

F5 Networks, Inc., "BIG-IP® Access Policy Manager®: Edge Client® and Application Configuration", Manual, Aug. 25, 2014, pp. 1-66, version 11.6, F5 Networks, Inc.

F5 Networks, Inc., "BIG-IP® Access Policy Manager®: Implementations", Manual, Aug. 25, 2014, pp. 1-98, version 11.6, F5 Networks, Inc.

F5 Networks, Inc., "BIG-IP® Access Policy Manager®: Secure Web Gateway Implementations", Manual, Aug. 25, 2014, pp. 1-160, version 11.6, F5 Networks, Inc.

F5 Networks, Inc., "Configuration Guide for BIG-IP® Access Policy Manager®", Manual, Sep. 30, 2013, pp. 1-369, Version 11.4.

F5 Networks, Inc., "F5 BIG-IP Access Policy Management Operations Guide ", Manual, May 5, 2015, pp. 1-168.

\* cited by examiner

METHODS FOR PARAMETERIZED SUB-POLICY EVALUATION FOR FINE GRAIN ACCESS CONTROL DURING A SESSION AND DEVICES THEREOF

This application claims the benefit of U.S. Provisional Patent Application Ser. No. 62/416,522 filed Nov. 2, 2016, which is hereby incorporated by reference in its entirety.

FIELD

This technology relates to methods for parameterized sub-policy evaluation for fine grain access control during a session and devices thereof.

BACKGROUND

A step-up authentication policy is essentially a sub-policy that executes in the context of a per-request policy, and can request a client computing device to perform additional authentication actions before allowing access to the protected resource. The intention is to allow the policy fine grained control of resources that are considered particularly sensitive and that require an additional authentication factor and/or require additional auditing controls.

Unfortunately, the previously existing problem with trying to provide this fine grained control is that a classification/categorization agent in the policy may generate a large fan out and could potentially cause a very large policy to be represented in a tree-based policy representation (e.g. Visual Policy Editor (VPE)). This is because even if the sub-policy is essentially the same for each classification that requires step-up authentication, successful authentication against one classification (like a Facebook chat) does not indicate successful classification against a different classification (like a job search).

The obvious way to deal with that is to copy the sub-policy, creating a different instance of it manually for each classification that needs identical sub-policy evaluation. This creates two problems. One is that the manual work of duplicating each sub-policy instance and placing them on the correct branch is cumbersome. Two is that the size of the policy may become too large to effectively view and edit, and thus becomes difficult to manage effectively.

SUMMARY

A method for parameterized sub-policy evaluation for fine grain access control implemented by a network traffic management system comprising one or more network traffic management apparatuses, client devices, or server devices, the method includes determining when there is a result for one of the plurality of sub-policies being evaluated for a received request for a resource during a session. The result is used for evaluation of the one of the plurality of sub-policies for the received request when the determination indicates the result is stored for the session. One of the plurality of sub-policies on the received request is executed to obtain the result when the determination indicates the result is not stored for the session. The result from this execution is stored for the session for the one of the plurality of sub-policies.

A network traffic management apparatus includes a memory with programmed instructions stored thereon and one or more processors configured to be capable of executing the stored programmed instructions to determine when there is a result for one of the plurality of sub-policies being evaluated for a received request for a resource during a session. The result is used for evaluation of the one of the plurality of sub-policies for the received request when the determination indicates the result is stored for the session. One of the plurality of sub-policies on the received request is executed to obtain the result when the determination indicates the result is not stored for the session. The result from this execution is stored for the session for the one of the plurality of sub-policies.

A non-transitory computer readable medium having stored thereon instructions for providing parameterized sub-policy evaluation for fine grain access control comprising executable code which when executed by one or more processors, causes the one or more processors to determine when there is a result for one of the plurality of sub-policies being evaluated for a received request for a resource during a session. The result is used for evaluation of the one of the plurality of sub-policies for the received request when the determination indicates the result is stored for the session. One of the plurality of sub-policies on the received request is executed to obtain the result when the determination indicates the result is not stored for the session. The result from this execution is stored for the session for the one of the plurality of sub-policies.

A network traffic management system, comprising one or more traffic management apparatuses, client devices, or server devices, the network traffic management system comprising memory comprising programmed instructions stored thereon and one or more processors configured to be capable of executing the stored programmed instructions to determine when there is a result for one of the plurality of sub-policies being evaluated for a received request for a resource during a session. The result is used for evaluation of the one of the plurality of sub-policies for the received request when the determination indicates the result is stored for the session. One of the plurality of sub-policies on the received request is executed to obtain the result when the determination indicates the result is not stored for the session. The result from this execution is stored for the session for the one of the plurality of sub-policies.

This technology provides a number of advantages including providing methods, non-transitory computer readable medium, apparatuses and systems that more effectively and efficiently manage policy application to provide fine grain access control. This technology avoids the need to create separate branches from a classification agent and multiple instances of essentially the same sub-policy for each branch.

BRIEF DESCRIPTION OF THE DRAWINGS

FIG. 1 is an example of a block diagram of an environment including an exemplary network traffic management system with a network traffic management apparatus that;

DETAILED DESCRIPTION

Figure 1:
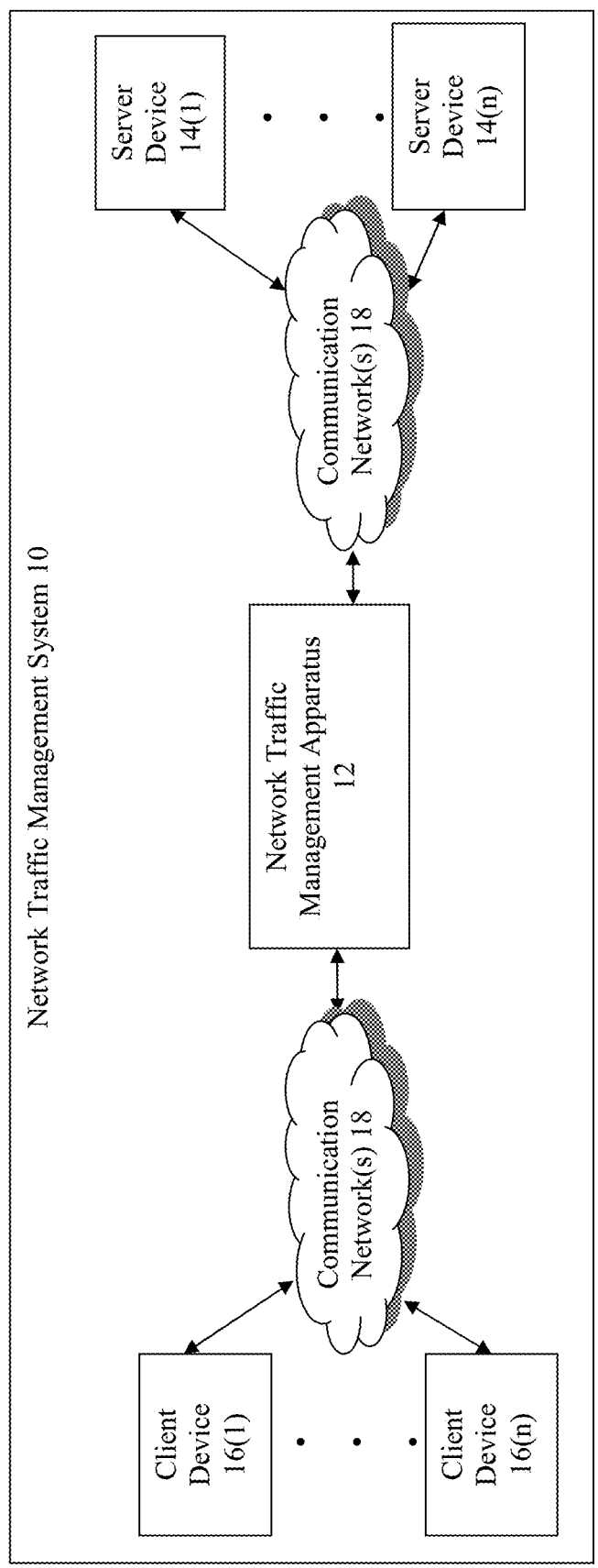

Referring to FIG. 1, an exemplary network environment which incorporates an exemplary network traffic management system that provides parameterized sub-policy evaluation for fine grain access control during a session is illustrated. The network traffic management system in this example includes a network traffic management apparatus that is coupled to a plurality of server devices and a plurality of client devices via communication network(s), although the network traffic management apparatus, server devices, and/or client devices may be coupled together via other topologies. Additionally, the network traffic management system may include other network devices such as one or more routers and/or switches, for example, which are well known in the art and thus will not be described herein. This technology provides a number of advantages including methods, non-transitory computer readable media, network traffic management systems, and network traffic management apparatuses that provide parameterized sub-policy evaluation for fine grain access control during a session.

Figure 2:
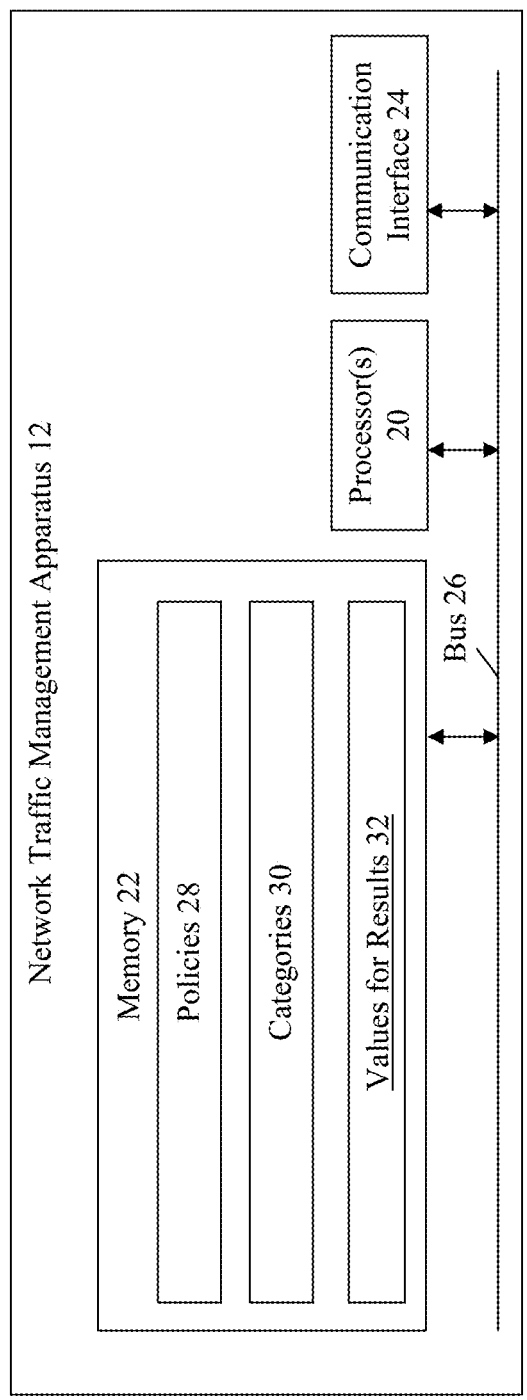
FIG. 2 is an example of a block diagram of the network traffic manager apparatus.

Referring to FIGS. 1-2, the network traffic management apparatus of the network traffic management system may perform any number of functions including by way of example only managing network traffic, load balancing network traffic across the server devices, accelerating network traffic associated with web applications hosted by the server devices, and/or providing parameterized sub-policy evaluation for fine grain access control during a session. The network traffic management apparatus includes one or more processors, a memory, and/or a communication interface, which are coupled together by a bus or other communication link, although the network traffic management apparatus can include other types and/or numbers of elements in other configurations.

The processor(s) of the network traffic management apparatus may execute programmed instructions stored in the memory of the network traffic management apparatus for the any number of the functions identified above. The processor(s) of the network traffic management apparatus may include one or more CPUs or general purpose processors with one or more processing cores, for example, although other types of processor(s) can also be used.

The memory of the network traffic management apparatus stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Figure 3:
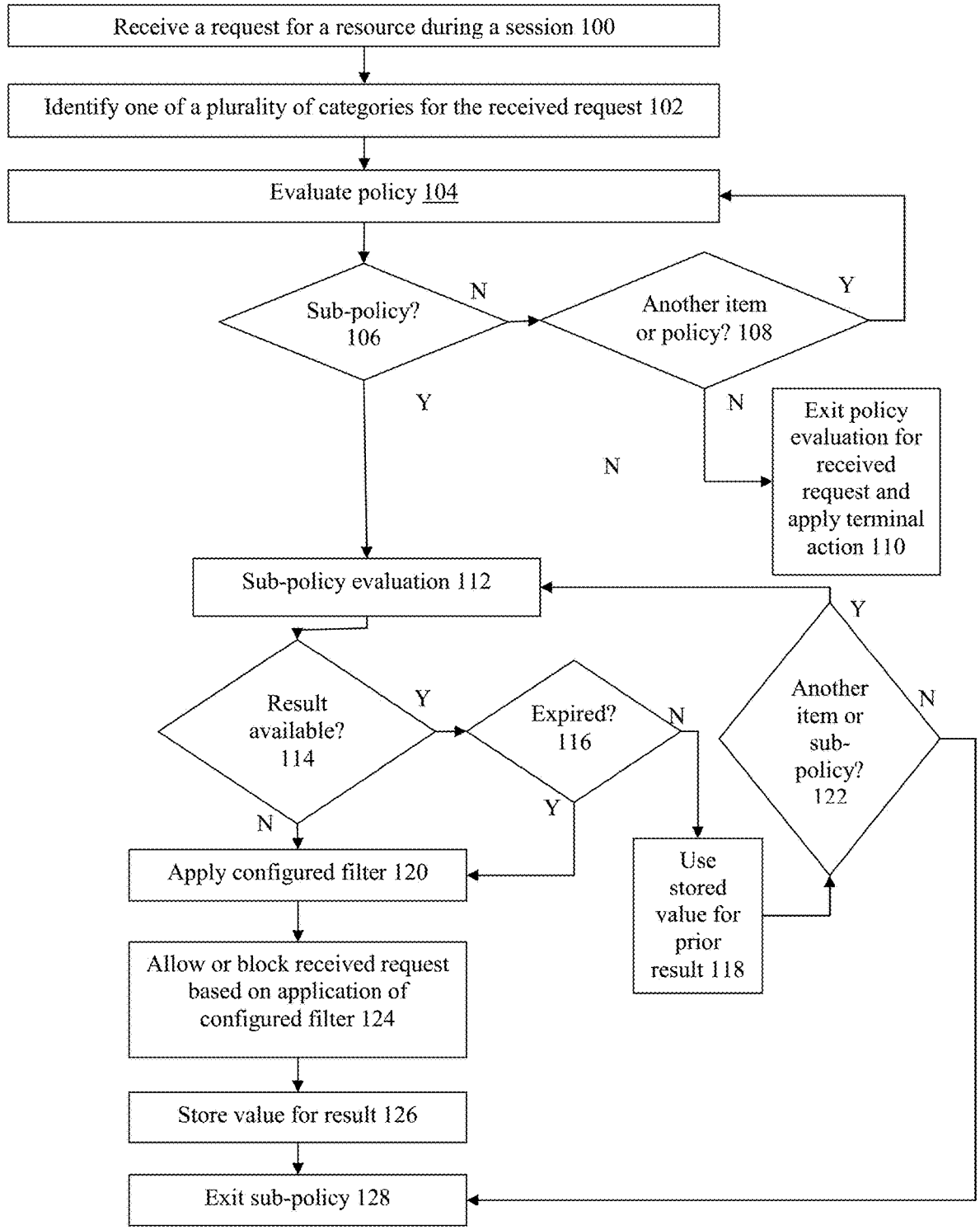
FIG. 3 is an example of a flowchart of a method for providing parameterized sub-policy evaluation for fine grain access control during a session.

Accordingly, the memory of the network traffic management apparatus can store one or more applications that can include computer executable instructions that, when executed by the network traffic management apparatus, cause the network traffic management apparatus to perform actions, such as to transmit, receive, or otherwise process messages, for example, and to perform other actions described and illustrated below with reference to FIG. 3. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus itself, may be located in virtual server(s) running in a cloud-based computing environment rather than being tied to one or more specific physical network computing devices. Also, the application(s) may be running in one or more virtual machines (VMs) executing on the network traffic management apparatus. Additionally, in one or more embodiments of this technology, virtual machine(s) running on the network traffic management apparatus may be managed or supervised by a hypervisor.

Figure 4:
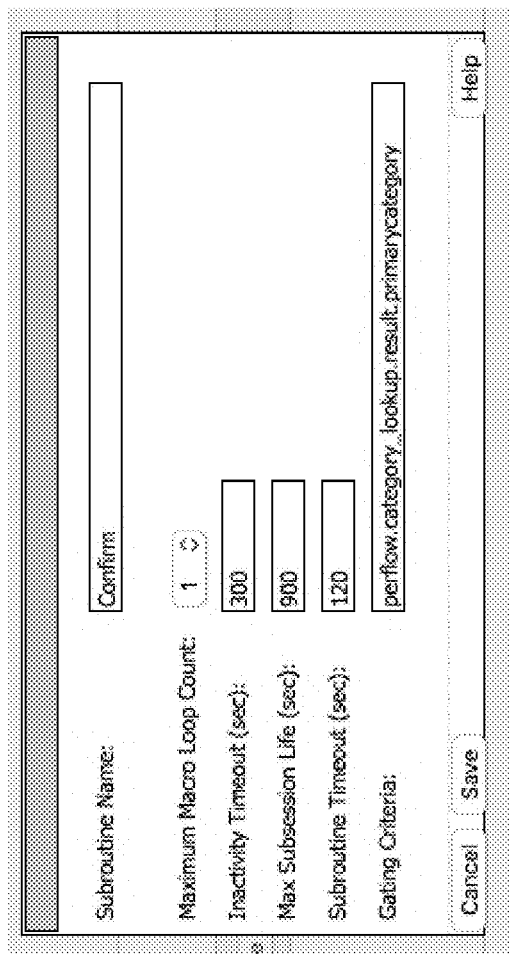
FIG. 4 is a screenshot of an example of a user interface to enable an administrator of the network traffic management apparatus to configure one or more policies and/or sub-policies for application to received requests for resources.

In this particular example, the memory of the network traffic management apparatus includes stored policies, categories, and values for results, although the memory can include other types and/or numbers of other policies, categories, modules, databases, or applications, for example. Each of the policies may comprise one or more items and one or more sub-policies. Each of the items may comprise an action that when executed produces a result which allows the policy to proceed to the next step in evaluation until a terminal or end of the evaluation is reached. The next step in each of the policies can be another item or a sub-policy. Each of the sub-policies runs a "set" or collection of one or more ordered items which each may comprise an action that when executed produces a result which allows the sub-policy to proceed to the next step in evaluation until a terminal or end of the evaluation is reached. As illustrated in FIG. 4, this technology can provide a user interface to enable an administrator of the network traffic management apparatus to configure one or more policies and/or sub-policies for application to received requests for resources. The stored values comprise values stored for prior determinations to facilitate faster and more efficient processing sub-policies on received requests for resources in the same identified one of the plurality of categories.

The communication interface of the network traffic management apparatus operatively couples and communicates between the network traffic management apparatus, the server devices, and/or the client devices, which are all coupled together by the communication network(s), although other types and/or numbers of communication networks or systems with other types and/or numbers of connections and/or configurations to other devices and/or elements can also be used.

By way of example only, the communication network(s) can include local area network(s) (LAN(s)) or wide area network(s) (WAN(s)), and can use TCP/IP over Ethernet and industry-standard protocols, although other types and/or numbers of protocols and/or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) can also include direct connection(s) (e.g., for when a device illustrated in FIG. 1, such as the network traffic management apparatus, one or more of the client devices, or one or more of the server devices operate as virtual instances on the same physical machine).

While the network traffic management apparatus is illustrated in this example as including a single device, the network traffic management apparatus in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus.

Additionally, one or more of the devices that together comprise the network traffic management apparatus in other examples can be standalone devices or integrated with one or more other devices or apparatuses, such as one of the server devices, for example. Moreover, one or more of the devices of the network traffic management apparatus in these examples can be in a same or a different communication network including one or more public, private, or cloud networks, for example.

Each of the server devices of the network traffic management system in this example includes one or more processors, a memory, and a communication interface, which are coupled together by a bus or other communication link, although other numbers and/or types of network devices could be used. The server devices in this example process requests received from the client devices via the communication network(s) according to the HTTP-based application RFC protocol, for example, although other types of protocols may be used with this technology, such as non-HTTP protocols by way of example only. Various applications may be operating on the server devices and transmitting data (e.g., files or Web pages) to the client devices via the network traffic management apparatus in response to requests from the client devices. The server devices may be hardware or software or may represent a system with multiple servers in a pool, which may include internal or external networks.

Although the server devices are illustrated as single devices, one or more actions of each of the server devices may be distributed across one or more distinct network computing devices that together comprise one or more of the server devices. Moreover, the server devices are not limited to a particular configuration. Thus, the server devices may contain a plurality of network computing devices that operate using a master/slave approach, whereby one of the network computing devices of the server devices operate to manage and/or otherwise coordinate operations of the other network computing devices. The server devices may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices can operate within the network traffic management apparatus itself rather than as a stand-alone server device communicating with the network traffic management apparatus via the communication network(s). In this example, the one or more server devices operate within the memory of the network traffic management apparatus.

The client devices of the network traffic management system in this example include any type of computing device, such as mobile computing devices, desktop computing devices, laptop computing devices, tablet computing devices, virtual machines (including cloud-based computers), or the like. Each of the client devices in this example includes a processor, a memory, and a communication interface, which are coupled together by a bus or other communication link, although other numbers and/or types of network devices could be used.

The client devices may run interface applications, such as standard Web browsers or standalone client applications, which may provide an interface to make requests for, and receive content stored on, one or more of the server devices via the communication network(s). The client devices may further include a display device, such as a display screen or touchscreen, and/or an input device, such as a keyboard for example.

Although the exemplary network traffic management system with the network traffic management apparatus, server devices, client devices, and communication network(s) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system, such as the network traffic management apparatus, client devices, or server devices, for example, may be configured to operate as virtual instances on the same physical machine. In other words, one or more of the network traffic management apparatus, client devices, or server devices may operate on the same physical device rather than as separate devices communicating through communication network(s). Additionally, there may be more or fewer network traffic management apparatus, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of parameterized sub-policy evaluation for fine grain access control during a session will now be described with reference to FIGS. 1-7. Referring more specifically to FIG. 3, at a first step in this example, the network traffic management apparatus of the network traffic management system receives a request for a resource from one of the client computing devices for one of the server devices. By way of example only, the received request for a resource can be a request for a URL for a particular website hosted by one of the server devices, although other types and/or numbers of resources could be requested.

At the next step in this example, the network traffic management apparatus of the network traffic management system identifies one of a plurality of categories for a received request for a resource during a session. By way of example, a session is a reference to a communication which may comprises independent requests with responses between for example two devices that is set up or established at a certain point in time and then terminated at some later point in time. Additionally by way of example only, the plurality of categories are categories for different types of website requests that are stored in the memory of the network traffic management apparatus, although other types and/or numbers of categories for other types and/or numbers of resources could be used. Further by way of example only, the request for the URL can be categorized based on one of a plurality of types of stored categories for URLs, such as a search engine category, a social media category, a sports category, a news category, etc., although the types and/or numbers of categories can vary as established, such as by the administrator of the network traffic management apparatus. By way of further example only, a received request for "http://www.google.com" or "http://www.yahoo.com" would be in a search engine category while "http://www.cnn.com" would be in a news category.

At the next step in this example, the network traffic management apparatus of the network traffic management system may evaluate a policy for the received request based on the identified one of the plurality of categories for the received request. Each policy that is evaluated may comprise one or more items and one or more sub-policies. Each of the items may comprise an action that when executed by the network traffic management apparatus of the network traffic management system during the evaluation may produce a result which allows the policy to proceed to the next step in evaluation until a terminal or end is reached. The next step in each of the policies can be another item or a sub-policy.

Accordingly at the next step in this example, the network traffic management apparatus of the network traffic management system may determine if the next step is a sub-policy. If the network traffic management apparatus of the network traffic management system determines the next step is not a sub-policy, then the No branch is taken to determine if the next step is either another item for the policy or another policy for the received request. If the network traffic management apparatus of the network traffic management system determines the next step is not another item or another policy for the received request then the No branch is taken and the network traffic management apparatus of the network traffic management system may exit policy evaluation for the received request and apply a terminal action. If the network traffic management apparatus of the network traffic management system determines the next step is another item or another policy for the received request then the Yes branch is taken back to the earlier step described above where and the network traffic management apparatus of the network traffic management system may evaluate the another item or another policy for the received request.

If back in the earlier step described above, the network traffic management apparatus of the network traffic management system determines the next step is a sub-policy, then the Yes branch is taken to evaluate the sub-policy. Each of the sub-policies runs a "set" or collection of one or more ordered items which each may comprise an action that when executed produces a result which allows the sub-policy to proceed to the next step in the evaluation until a terminal or end of the evaluation is reached.

At the next step in this example, the network traffic management apparatus of the network traffic management system may determine when there is a prior result for the evaluation of the sub-policy. If the network traffic management apparatus of the network traffic management system determines that the sub-policy is "validated" (has been evaluated before) and there is a prior stored result for the evaluation of the sub-policy, then the Yes branch is taken. Following this Yes branch the network traffic management apparatus of the network traffic management system may determine if the stored value for the result has expired. If the network traffic management apparatus of the network traffic management system determines, the stored value for the result has not expired, then the No branch is taken to the next step where the prior stored value for the result can be used for the evaluation of the sub-policy. If the network traffic management apparatus of the network traffic management system determines, the stored value for the result has expired, then the Yes branch may be taken to the step described in greater detail below where the sub-policy is executed on the received request, such as by applying a configured filter on the received request by way of example only.

By way of further example, a variable or other parameter called a "gating-criteria" may be in the properties for each of the sub-policies. In this example, a "gating criteria" in the sub-policy's properties has a variable perflow.category_lookup.result.primarycategory". When making the determination regarding whether there is a prior result, a sub-session associated using a concatenation of the following: (1)—name of the sub-policy; and (2)—value of any variable specified as the gating-criteria is looked up. If a valid sub-session is found then the Yes branch is taken which results in applying the unexpired stored result for the sub-policy which is more efficient. If a valid sub-session is not found or the stored value has expired, then the No branch is taken and the sub-policy is evaluated on the received request.

Referring back to the prior step where the unexpired stored value is used, next the network traffic management apparatus of the network traffic management system may determine whether there is either another item of the sub-policy or another sub-policy for the received request to evaluate. If the network traffic management apparatus of the network traffic management system determines there is not another item for the sub-policy or another policy to evaluate for the received request then the No branch is taken and the network traffic management apparatus of the network traffic management system may exit sub-policy evaluation for the received request. If however the network traffic management apparatus of the network traffic management system determines there is another item for the sub-policy or another policy to evaluate for the received request then the Yes branch is taken back to the earlier step described above where and the network traffic management apparatus of the network traffic management system may evaluate the another item of the sub-policy or another sub-policy for the received request.

If back in the earlier step the network traffic management apparatus of the network traffic management system determined there is not a prior result available for the evaluation of the sub-policy, then the No branch is taken to the next step. In this next step, the network traffic management apparatus of the network traffic management system may execute the sub-policy is executed on the received request, such as by applying a configured filter on the received request, although other manners for executing the sub-policy may be used. By way of example only, the configured filters may comprise URL filters which are stored in the memory of the network traffic management apparatus, although other types and/or numbers of configured filters could be used.

Figure 5:
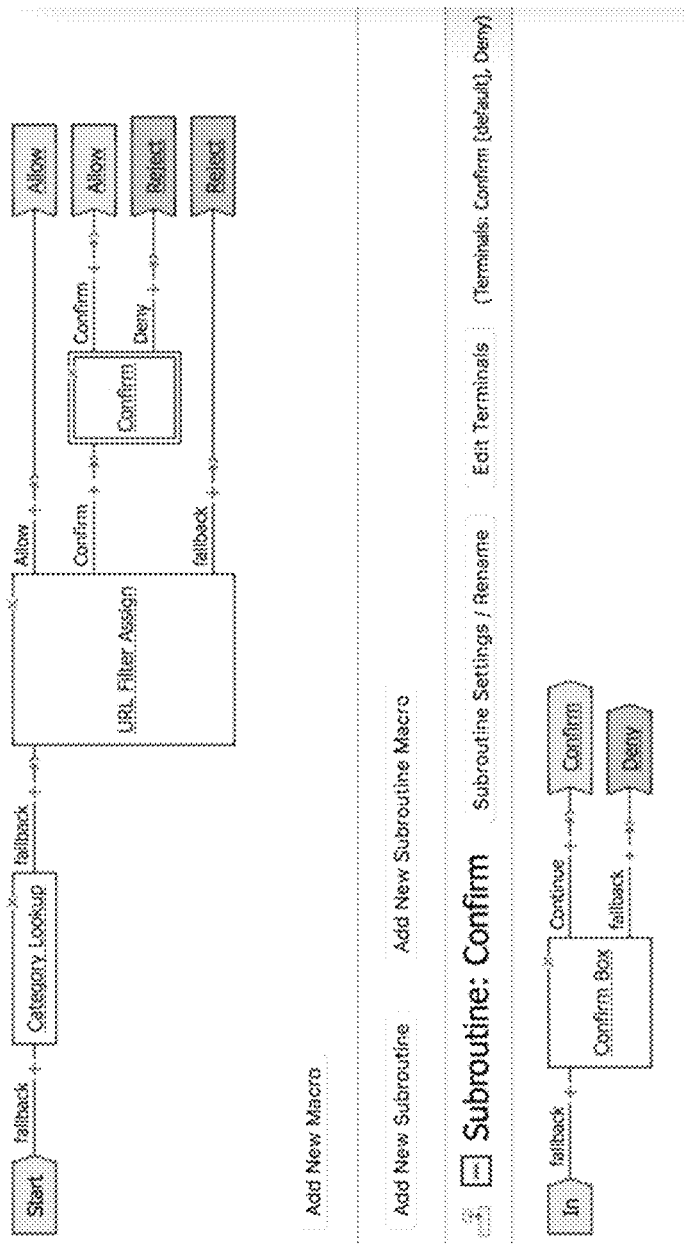
FIG. 5 is a diagram of an example of an application of URL filters configured for evaluation of a sub-policy.

An example of the application of URL filters configured for the evaluation of a sub-policy by the network traffic management apparatus of the network traffic management system is illustrated in FIG. 5. In this illustrated example, URL filters define actions for every identified category within the filter object so based on a category lookup the network traffic management apparatus of the network traffic management system may simply assign and apply the URL filter based on the category lookup. However, in other examples URL or other filters may not be needed for the evaluation of the sub-policy by the network traffic management apparatus of the network traffic management system. For example, if the sub-policy being evaluated does not involve categories, then URL filters would not be needed for the sub-policy evaluation by the network traffic management apparatus of the network traffic management system.

Figure 6:
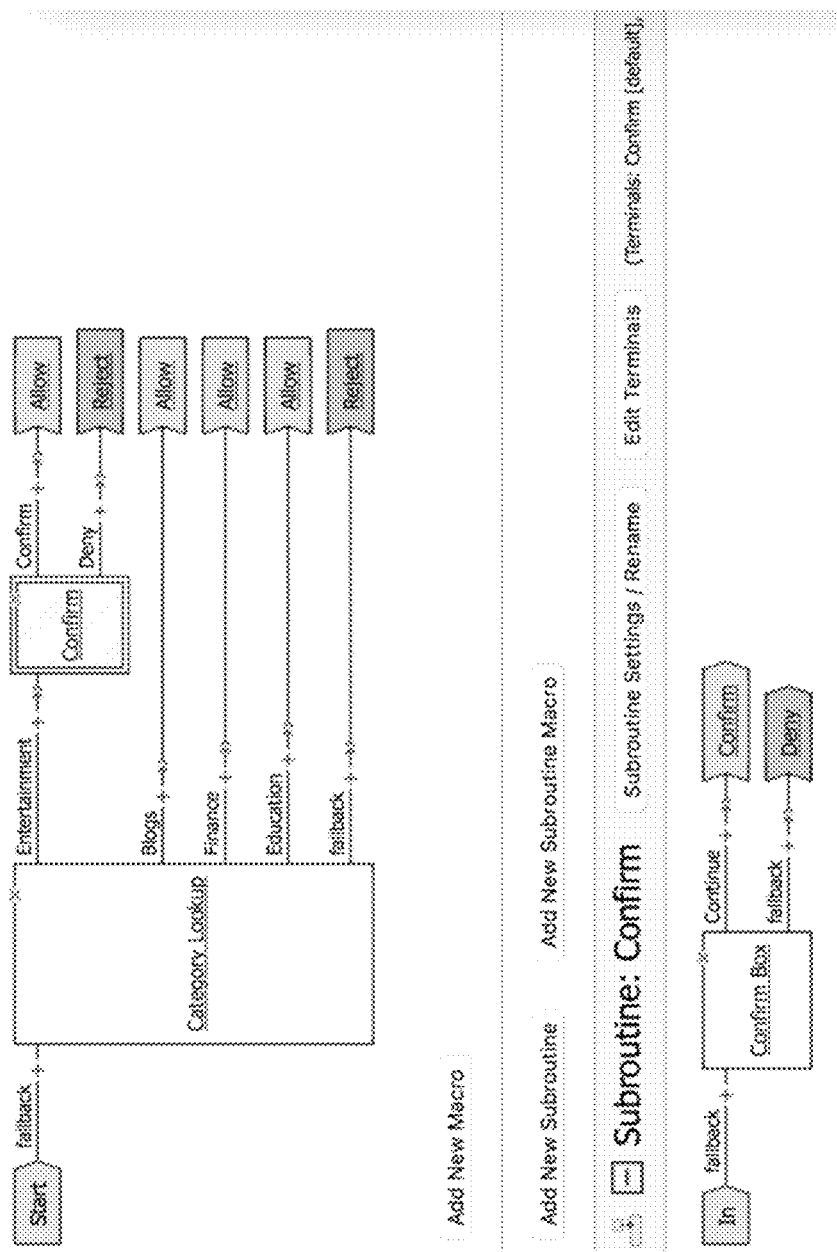
FIG. 6 is a diagram of an example of an evaluation of a sub-policy without any URL filters.

An example of the evaluation of a sub-policy without any URL filters by the network traffic management apparatus of the network traffic management system is illustrated in FIG. 6. In this illustrated example, the sub-policy being evaluated by the network traffic management apparatus of the network traffic management system involves a category look-up, such as categories for Entertainment, Blogs, Finance, Education, or fallback, which then translate into actions based on the look-up as illustrated.

Referring back to FIG. 3, at the next step in this example the network traffic management apparatus of the network traffic management system may determine whether to allow or block (e.g. reject) the received request based on the application of the configured filter or the other execution of the sub-policy. By way of example only, the application of the configured filter or the other execution of the sub-policy by the network traffic management apparatus of the network traffic management system may result in obtaining a request for confirmation from the requesting client computing device or obtaining a result of a step-up authentication from the requesting client computing device to determine whether to allow or block, although other types and/or numbers of configured filters could be applied.

By way of further example, if received request is for "http://www.cnn.com" and there is no stored value for the identified category of news, then the network traffic management apparatus of the network traffic management system the application of the configured filter may results in a request to the requesting one of the client computing devices to confirm the request for the requested resource. If a "confirm" is received by the network traffic management apparatus of the network traffic management system, then the requesting one of the client computing devices will be allowed through and any other response will result in a block or other denial of the request. If the during the same session there is another request for http://www.google.com" and there is no stored value for the identified category for search engine, then evaluation of the sub-policy may be executed in the manner described above. However, if during the same session there is another request for "http://www.yahoo.com" and there is a prior stored value for the identified category for search engine, then an action can be taken based on the stored value as described earlier.

Figure 7:
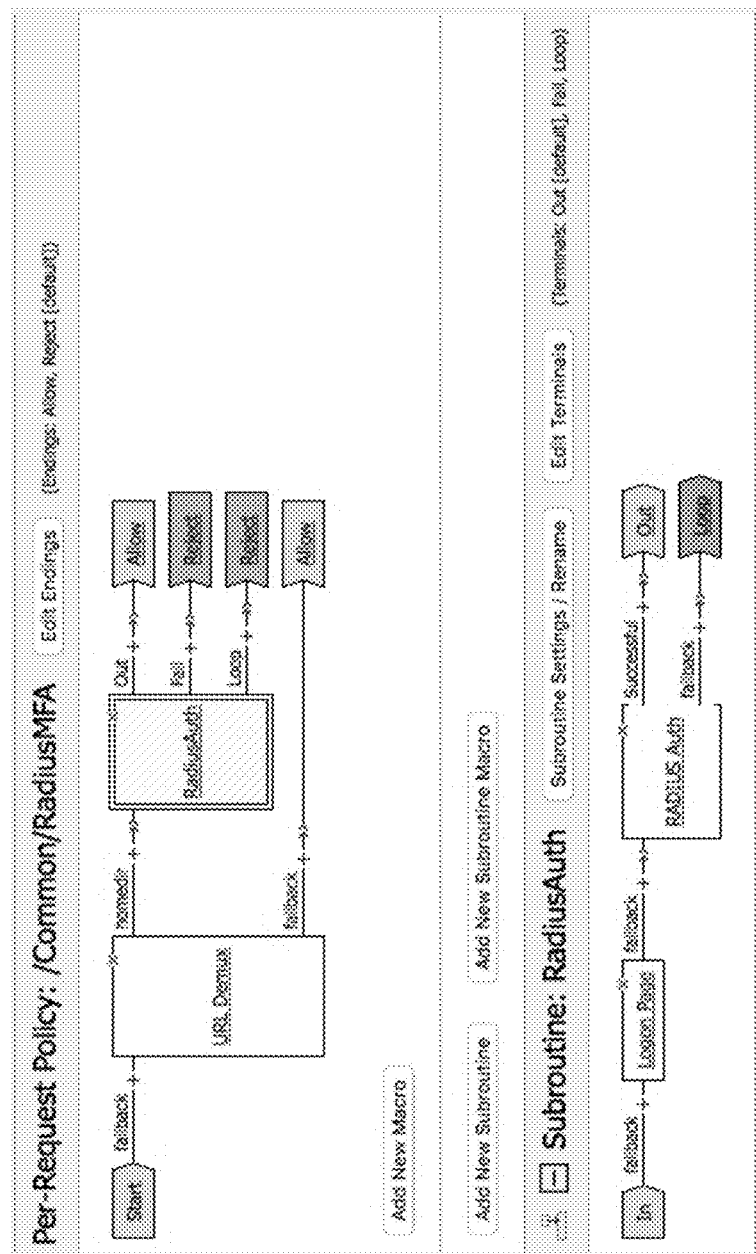
FIG. 7 is a diagram of an example of a step-up authentication.

By way of another example, an example of a step-up authentication is illustrated in FIG. 7. In this illustrated example, "RadiusAuth" is the subpolicy in the "RadiusMFA" policy. Accordingly, in this example the evaluation of "RadiusMFA" policy leads to the evaluation of the sub-policy "RadiusAuth" by the network traffic management apparatus of the network traffic management system which results in the execution of a step-up authentication "RADIUS Auth".

Referring back to FIG. 3 at the next step in this example, the network traffic management apparatus of the network traffic management system may store for the session the result for the sub-policy for the received request for the resource as value, although the result can be stored in other manners. Additionally, since this parameterization could result in a massive number of sub-policy instances (e.g. if there are a million values, then there could be one instance of a sub-policy for every value), the total number of active instances of a sub-policy may be constrained by the network traffic management apparatus of the network traffic management system based on a stored or otherwise input or received maximum configuration value. The network traffic management apparatus of the network traffic management system may track the total number of active instances of a sub-policy, determine when the total number exceeds the maximum configuration value, and purge one of the active instances based on an algorithm, such as least recently used (LRU) by way of example. Next, the network traffic management apparatus of the network traffic management system may evaluate another sub-policy if needed in the manner illustrated and described by way of the examples herein or may exit the sub-policy evaluation.

Accordingly, as illustrated and described by way of the examples herein this technology relates to methods, non-transitory computer readable medium, apparatuses and systems that more effectively and efficiently manage policy application to provide fine grain access control. This technology avoids the need to create separate branches from a classification agent and multiple instances of essentially the same sub-policy for each branch.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for parameterized sub-policy evaluation for fine grain access control implemented by a network traffic management system comprising one or more network traffic management apparatuses, client devices, or server devices, the method comprising:

selecting an authentication policy applicable to a received request based on an identified request category for the received request, the identified request category being selected from a plurality of types of categories, the plurality of types including at least one of a search engine category, a social media category, a sports category, or a news category;

traversing one or more sub-policies and executing any one or more action items associated with the selected authentication policy applicable to the received request to obtain the result of a step-up authentication;

determining when there is an existing valid prior stored sub-policy result associated with a traversed sub-policy of the selected authentication policy;

using the existing valid prior stored sub-policy result to evaluate the received request when the determination indicates there is an existing valid prior stored sub-policy result and using a new sub-policy result generated by executing the sub-policy of the selected authentication policy when the determination indicates there is no existing valid prior stored sub-policy result;

authorizing the received request when the evaluation of the received request is completed using either an existing valid prior stored sub-policy result or a newly generated sub-policy result and any action items associated with the authentication policy are executed; and requesting confirmation of the request from a client from which the received request originated when evaluation of the received request cannot be authorized before sending the authorized received request to another resource for further handling.

2. The method as set forth in claim 1, wherein traversing one or more sub-policies and executing any one or more action items associated with the selected authentication policy applicable to the received request comprises obtaining confirmation from the client in response to the requesting confirmation from the client.

3. The method as set forth in claim 1, wherein a valid prior stored sub-policy result comprises a prior stored sub-policy result that has not expired and an invalid prior stored sub-policy result comprises a prior stored sub-policy result that has expired.

4. A network traffic management apparatus, comprising memory comprising programmed instructions stored thereon and one or more processors configured to be capable of executing the stored programmed instructions to:

select an authentication policy applicable to a received request based on an identified request category for the received request, the identified request category being selected from a plurality of types of categories, the plurality of types including at least one of a search engine category, a social media category, a sports category, or a news category;

traverse one or more sub-policies and executing any one or more action items associated with the selected authentication policy applicable to the received request to obtain the result of a step-up authentication;

determine when there is an existing valid prior stored sub-policy result associated with a traversed sub-policy of the selected authentication policy;

use the existing valid prior stored sub-policy result to evaluate the received request when the determination indicates there is an existing valid prior stored sub-policy result and using a new sub-policy result generated by executing the sub-policy of the selected authentication policy when the determination indicates there is no existing valid prior stored sub-policy result;

authorize the received request when the evaluation of the received request is completed using either an existing valid prior stored sub-policy result or a newly generated sub-policy result and any action items associated with the authentication policy are executed; and request confirmation of the request from a client from which the received request originated when evaluation of the received request cannot be authorized before sending the authorized received request to another resource for further handling.

5. The apparatus as set forth in claim 4, wherein traversing one or more sub-policies and executing any one or more action items associated with the selected authentication policy applicable to the received request comprises obtaining confirmation from the client in response to the requesting confirmation from the client.

6. The apparatus as set forth in claim 4, wherein a valid prior stored sub-policy result comprises a prior stored sub-policy result that has not expired and an invalid prior stored sub-policy result comprises a prior stored sub-policy result that has expired.

7. A non-transitory computer readable medium having stored thereon instructions for providing parameterized sub-policy evaluation for fine grain access control comprising executable code which when executed by one or more processors, causes the one or more processors to:

select an authentication policy applicable to a received request based on an identified request category for the received request, the identified request category being selected from a plurality of types of categories, the plurality of types including at least one of a search engine category, a social media category, a sports category, or a news category;

traverse one or more sub-policies and executing any one or more action items associated with the selected authentication policy applicable to the received request to obtain the result of a step-up authentication;

determine when there is an existing valid prior stored sub-policy result associated with a traversed sub-policy of the selected authentication policy;

use the existing valid prior stored sub-policy result to evaluate the received request when the determination indicates there is an existing valid prior stored sub-policy result and using a new sub-policy result generated by executing the sub-policy of the selected authentication policy when the determination indicates there is no existing valid prior stored sub-policy result;

authorize the received request when the evaluation of the received request is completed using either an existing valid prior stored sub-policy result or a newly generated sub-policy result and any action items associated with the authentication policy are executed; and request confirmation of the request from a client from which the received request originated when evaluation of the received request cannot be authorized before sending the authorized received request to another resource for further handling.

8. The computer readable medium as set forth in claim 7, wherein traversing one or more sub-policies and executing any one or more action items associated with the selected authentication policy applicable to the received request comprises obtaining confirmation from the client in response to the requesting confirmation from the client.

9. The computer readable medium as set forth in claim 7, wherein a valid prior stored sub-policy result comprises a prior stored sub-policy result that has not expired and an invalid prior stored sub-policy result comprises a prior stored sub-policy result that has expired.

10. A network traffic management system, comprising one or more traffic management apparatuses, client devices, or server devices, the network traffic management system comprising memory comprising programmed instructions stored thereon and one or more processors configured to be capable of executing the stored programmed instructions to:

select an authentication policy applicable to a received request based on an identified request category for the received request, the identified request category being selected from a plurality of types of categories, the plurality of types including at least one of a search engine category, a social media category, a sports category, or a news category;

traverse one or more sub-policies and executing any one or more action items associated with the selected authentication policy applicable to the received request to obtain the result of a step-up authentication;

determine when there is an existing valid prior stored sub-policy result associated with a traversed sub-policy of the selected authentication policy;

use the existing valid prior stored sub-policy result to evaluate the received request when the determination indicates there is an existing valid prior stored sub-policy result and using a new sub-policy result generated by executing the sub-policy of the selected authentication policy when the determination indicates there is no existing valid prior stored sub-policy result;

authorize the received request when the evaluation of the received request is completed using either an existing valid prior stored sub-policy result or a newly generated sub-policy result and any action items associated with the authentication policy are executed; and request confirmation of the request from a client from which the received request originated when evaluation of the received request cannot be authorized before sending the authorized received request to another resource for further handling.

11. The system as set forth in claim 10, wherein traversing one or more sub-policies and executing any one or more action items associated with the selected authentication policy applicable to the received request comprises obtaining confirmation from the client in response to the requesting confirmation from the client.

12. The system as set forth in claim 10, wherein a valid prior stored sub-policy result comprises a prior stored sub-policy result that has not expired and an invalid prior stored sub-policy result comprises a prior stored sub-policy result that has expired.

* * * * *